(12) United States Patent
Schibsbye et al.

(10) Patent No.: US 11,919,258 B2
(45) Date of Patent: Mar. 5, 2024

(54) WIND TURBINE MOLD B-SURFACE HEATING AND COOLING USING VACUUM BAG WITH FLUID CHANNELS

(71) Applicant: TPI Composites, Inc., Warren, RI (US)

(72) Inventors: Karsten Schibsbye, Fredericia (DK); Amir Salimi, Providence, RI (US)

(73) Assignee: TPI COMPOSITES, INC., Warren, RI (US)

( * ) Notice: Subject to any disclaimer, the term of this patent is extended or adjusted under 35 U.S.C. 154(b) by 301 days.

(21) Appl. No.: 16/698,212

(22) Filed: Nov. 27, 2019

(65) Prior Publication Data

US 2020/0171764 A1 Jun. 4, 2020

Related U.S. Application Data

(60) Provisional application No. 62/773,730, filed on Nov. 30, 2018.

(51) Int. Cl.
*B29C 70/44* (2006.01)
*B29C 33/04* (2006.01)
(Continued)

(52) U.S. Cl.
CPC .............. *B29C 70/44* (2013.01); *B29C 33/04* (2013.01); *B29C 43/12* (2013.01); *B29C 43/52* (2013.01);
(Continued)

(58) Field of Classification Search
CPC ... B29C 2033/042; B29C 33/04; B29C 43/12; B29C 43/52; B29C 70/44; B29C 70/544;
(Continued)

(56) References Cited

U.S. PATENT DOCUMENTS 5,439,635 A * 8/1995 Seemann ............ B29C 43/3642
264/510
5,565,162 A * 10/1996 Foster .................. B29C 70/443
264/258
(Continued)

FOREIGN PATENT DOCUMENTS

CN 101549562 A 10/2009
CN 102186657 A 9/2011
(Continued)

OTHER PUBLICATIONS

International Search Report and Written Opinion for International Application No. PCT/US2019/063662 dated Jan. 22, 2020.
(Continued)

*Primary Examiner* — Yunju Kim
(74) *Attorney, Agent, or Firm* — Stephen J. Kenny; Vincenzo DiMonaco; Foley Hoag LLP

(57) ABSTRACT

Devices, systems, and methods of improving heat transfer between a composite wind turbine blade surface are provided to reduce cure time. The assembly includes molds having heating wires disposed proximate the mold surface for delivering heat to the composite blade during layup and/or resin cure. Additionally, the vacuum bag disposed on top of the composite part includes a plurality of fluid channels for distributing a thermal fluid (e.g. heated/cooled water, air or oil) across the composite surface (opposite the mold surface).

9 Claims, 5 Drawing Sheets

(51) Int. Cl.
  *B29C 43/12* (2006.01)
  *B29C 43/52* (2006.01)
  *F03D 13/10* (2016.01)
  *B29L 31/08* (2006.01)

(52) U.S. Cl.
  CPC ........ *F03D 13/10* (2016.05); *B29L 2031/085* (2013.01)

(58) Field of Classification Search
  CPC ... B29C 33/02; B29C 33/046; B29C 33/0066; B29C 33/10; B29D 99/0028; B29L 2031/085; F03D 13/10; Y02E 10/72; Y02P 70/50
  USPC ........................................................ 425/407
  See application file for complete search history.

(56) References Cited

U.S. PATENT DOCUMENTS

| | | | | |
|---|---|---|---|---|
| 6,149,844 | A * | 11/2000 | Graham | ................. B29C 70/44 425/389 |
| 9,492,972 | B2 * | 11/2016 | Mikkelson | ............ B29C 70/547 |
| 2011/0169190 | A1 | 7/2011 | Miller et al. | |
| 2014/0117593 | A1 | 5/2014 | Lyons et al. | |
| 2014/0327178 | A1 | 11/2014 | Davis et al. | |
| 2015/0226178 | A1 | 8/2015 | Randall | |

FOREIGN PATENT DOCUMENTS

| | | | |
|---|---|---|---|
| CN | 102458805 A | 5/2012 | |
| CN | 102510800 A | 6/2012 | |
| CN | 103133268 A | 6/2013 | |
| EP | 2689128 A2 | 1/2014 | |
| EP | 3064332 A1 * | 9/2016 | ............ B29C 33/04 |
| WO | WO-2020/113043 A1 | 6/2020 | |

OTHER PUBLICATIONS

Extended European Search Report for EP Application No. 19890210.8 dated Jul. 14, 2022.

International Preliminary Report on Patentability for International Application No. PCT/US2019/063662 dated May 25, 2021.

* cited by examiner

WIND TURBINE MOLD B-SURFACE HEATING AND COOLING USING VACUUM BAG WITH FLUID CHANNELS

CROSS-REFERENCE TO RELATED SUBJECT MATTER

This application claims the benefit under 35 USC 119 of U.S. Provisional Application No. 62/773,730, filed Nov. 30, 2018, which is hereby incorporated by reference in its entirety.

BACKGROUND

Embodiments of the present disclosure relate to devices, systems, and methods of improving manufacturing reliability and efficiency during wind turbine blade manufacture. In particular, the devices, systems, and methods of the present disclosure relate to directly heating and cooling a composite surface during a manufacturing process.

BRIEF SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes an apparatus for forming a composite wind turbine blade comprising: a first turbine blade half comprising a first shell; a second turbine blade half comprising a second shell; a first mold half comprising a first mold surface corresponding to the first shell; a second mold half comprising a first mold surface corresponding to the second shell; a first vacuum bag disposed above the first turbine blade shell; and a second vacuum bag disposed above the second turbine blade shell; and wherein the first vacuum bag includes a first series of fluid channels, at least a portion of the fluid channels disposed in contact with the first turbine blade shell; and wherein the second vacuum bag includes a second series of fluid channels, at least a portion of the fluid channels disposed in contact with the second turbine blade shell.

In some embodiments, a heating element can be disposed proximate the mold surfaces. In some embodiments, at least one fluid channel extends along the entire span of the blade, and/or from a leading edge to a trailing edge of the blade. In some embodiments, the fluid channels are distributed in a uniform pattern about a surface of the blade. In some embodiments, a first region of the blade (e.g. root section) has a first number of fluid channels and a second region of the blade (tip section) has a second number of fluid channels. In some embodiments, the fluid channels are configured with a uniform cross section. In some embodiments, an inlet and/or outlet fluid channel is configured with a greater diameter than a fluidly coupled distribution channel. In some embodiments, the fluid channels are configured for unidirectional flow. In some embodiments, a first fluid channel has a greater surface area in contact with the surface of the first shell than a second fluid channel.

In accordance with another aspect of the disclosure, a method of forming a wind turbine blade is provided which comprises: providing a first turbine blade half comprising a first shell; providing a second turbine blade half comprising a second shell; providing a first mold half comprising a first mold surface corresponding to the first shell, the first turbine blade half disposed within the first mold half; providing a second mold half comprising a first mold surface corresponding to the second shell where, the second turbine blade half disposed within the second mold half; providing a first vacuum bag disposed above the first turbine blade shell, wherein the first vacuum bag includes a first series of fluid channels, at least a portion of the fluid channels disposed in contact with the first turbine blade shell; providing a second vacuum bag disposed above the second turbine blade shell; wherein the second vacuum bag includes a second series of fluid channels, at least a portion of the fluid channels disposed in contact with the second turbine blade shell; and circulating a thermal fluid through the first series of fluid channels and the second series of fluid channels.

In some embodiments, circulating is provided by a pump disposed external to the mold halves. In some embodiments, the thermal fluid has a higher temperature than at least one of the first or second shell. In some embodiments, the thermal fluid has a lower temperature than at least one of the first or second shell. In some embodiments, circulating includes providing an inlet of thermal fluid proximate the blade root and an outlet of the thermal fluid proximate the blade tip.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE SEVERAL VIEWS OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION

Figure 1:
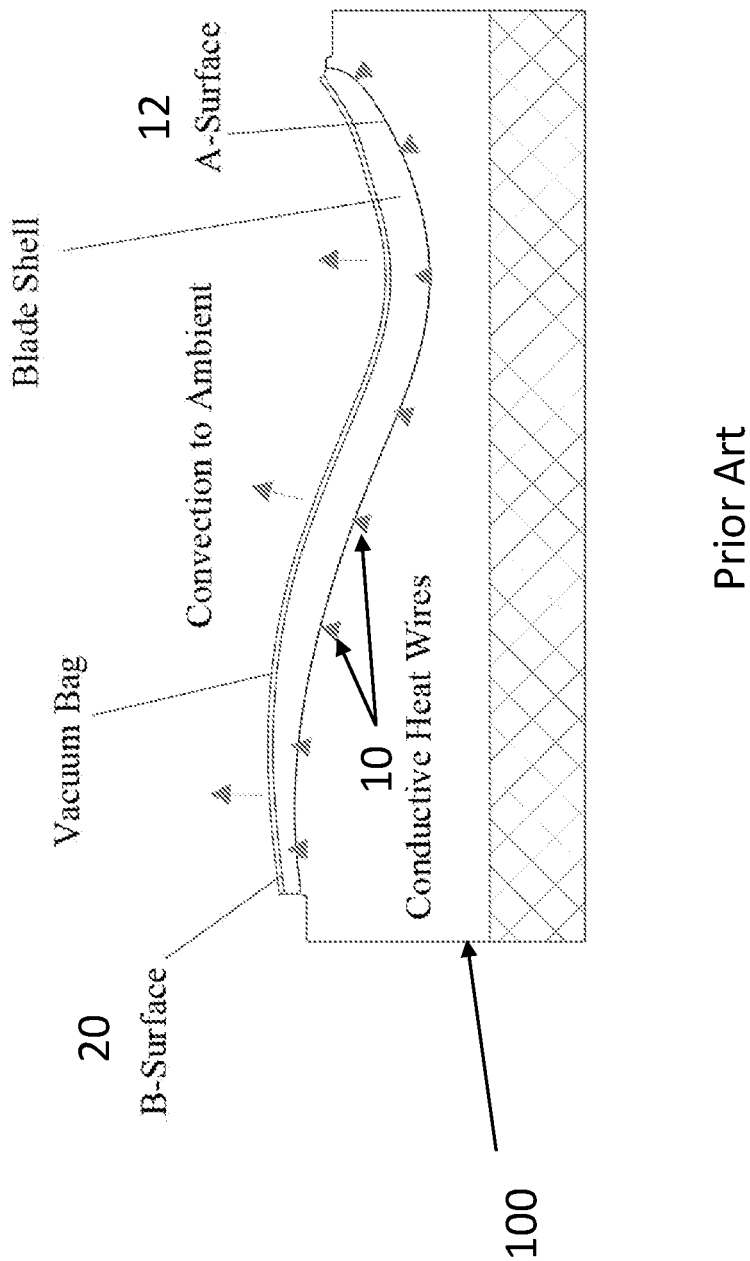
FIG. 1 illustrates a partial (one-sided) wind turbine blade mold with a conventional heating system.

Reference will now be made in detail to exemplary embodiments of the disclosed subject matter, an example of which is illustrated in the accompanying drawings. The method and corresponding steps of the disclosed subject matter will be described in conjunction with the detailed description of the system.

Modern wind turbine rotor blades are built from fiber-reinforced plastics as fiber-reinforced plastics have high strength-to-weight ratios. A rotor blade typically includes an airfoil shape having a rounded leading edge and a sharp trailing edge and the blade includes a blade root that connects to a hub of the turbine. Multiple rotor blades are connected at the respective blade root to the hub to create the wind turbine. The blade root includes a plurality of root bushings set within the fiber-reinforced polymer that provides reinforcement to the blade. Bolts are engaged with threads in the root bushings to connect the blade root to the hub.

A typical turbine blade is made by molding two half-shells in a pair of molds. A spar cap (analogous to the spar in an aircraft wing), web stiffeners (ribs) and other details may be optionally installed into one of the blade halves. Adhesive is applied to the bonding perimeter/edges of the first shell, for example, in equally-spaced beads. The second half shell is then turned over, still in its mold tool, and lowered onto the first. The molds are pressed together and the adhesive is allowed to cure, joining the two halves of the blade together. This process by which the two blade halves are joined together with paste is called blade closure.

In various embodiments, the mold may be made out of any suitable metal as is known in the art. In various embodiments, the mold may include a metal, such as, for example, aluminum, steel, stainless steel, titanium, tantalum, tungsten, or any suitable combination of metals (e.g., a metal alloy). In various embodiments, the mold may include a polymer, for example, polyethylene, polyurethane, polyethylene terephthalate, polyvinyl chloride, etc. In various embodiments, the mold may be made by machining (e.g., CNC machining), 3D printing (e.g., using Direct Metal Laser Sintering (DMLS) and Fused Deposition Modeling (FDM)), open molding, closed molding, resin infusion, compression molding, composite hand layup, injection molding, pultrusion, automated fiber placement, tube rolling, automated tape laying, filament winding, resin transfer molding, or any suitable manufacturing technique as is known in the art. One skilled in the art will recognize that any suitable 3D printing technique may be used to manufacture the components described herein.

The blade shells (i.e. high pressure side and low pressure side, or "inner" and "outer") of the blade are made of a fiber-reinforced polymer, such as fiberglass-reinforced epoxy resin. Other suitable fiber reinforcements may be incorporated together with other fibers or independently, such as, for example, carbon fiber (unidirectional and/or bidirectional), Kevlar, fiberglass (unidirectional and/or bidirectional), etc. Moreover, the blade shells may include any suitable number of layers of fiber reinforcement for the desired thickness and properties of the part. The core is made of any suitable material, such as, for example, a polymer foam (e.g., polyurethane, divinylcell, polyisocyanurate, etc.), a sandwich core (e.g., nomex honeycomb, aluminum honeycomb, balsa, etc.), and/or a polymer honeycomb material.

In forming the composite structure, e.g. wind turbine blade, polymers (which are epoxy based resin systems) are inserted into the mold in a series of panels or "layups". After reaching the designed degree of cure, these polymer layup segments serve as the matrix component in a composite structure to enable the uniform load sharing between reinforcement fibers thereby creating the ultimate mechanical strength in the part. While the cure process could progress in ambient temperature in some cases, in most applications including fabrication of wind turbine blades, external heat sources are employed.

As shown in FIG. 1, in a conventional fabrication of turbine blades' shells as well as small pre-fabricated parts (i.e. shear webs and girders), heating wires 10 are built into the tooling structure, e.g. the underlying mold surface 100, which act as heat sources on only the mold surface 12 (called "A-surface") to support the cure process. An obvious shortcoming of this approach is that such systems are limited to heating only and cannot provide cooling. Furthermore, in this traditional arrangement, much of the heat generated is dissipated into ambient air via forced convection at the top surface 20 (frequently called "B-surface" which is the composite blade itself).

Moreover, in the region proximate the root of the blade the thickness of the composite layers increases, which makes controlling the heating throughout the thickness difficult if not impossible using heat sources on only the A-surface. Furthermore, employing only A-surface heating elements provides even less control over the temperature along the B-surface. In addition to the excessive through thickness temperature decay due to the low value of conductivity coefficient of composite reinforcement layers, the relatively high specific heat of the layers makes the heating process unacceptably slow.

Figure 2:
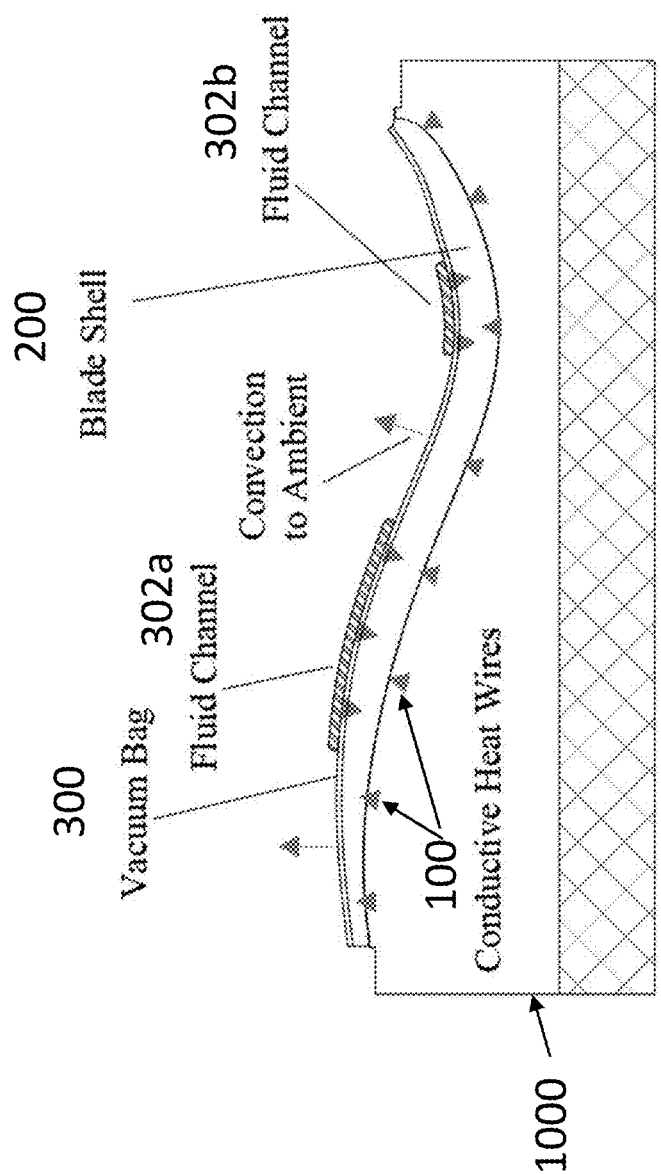
FIG. 2 illustrates a partial (one-sided) wind turbine blade mold with a heating system in accordance with the disclosed subject matter.

To address this issue, the current disclosure provides a system that delivers active heating and cooling directly on the manufactured composite component (i.e. the B-surface). In the exemplary embodiment shown in FIG. 2, heating wires 100 are built into the tooling structure, e.g. the underlying mold surface 1000. Additionally, a network of fluid channels 302 are incorporated into the vacuum bag 300 which overlays the composite part 200 being manufactured, with the vacuum bag serving as a barrier by which to create a vacuum force to pull the resin throughout the layup fibers). These fluid channels 302 serve as corridors for a heating and/or cooling fluid (e.g. oil or water) to travel throughout and deliver or remove heat from the composite part 200. The fluid channels 302 can be arranged to extend longitudinally (e.g. along the blade span from root to tip), in a chordwise direction (e.g. from leading edge to trailing edge), and/or be offset at an angle(s) (e.g. uniform or asymmetrical) thereto.

As noted above, the fluid channels 302 can extend along the entire span of the blade and from leading edge to trailing edge. In some embodiments the fluid channels 302 are distributed in a uniform pattern across the surface area of the blade. In some embodiments, the fluid channels 302 can be patterned with regions of the blade (e.g. root) having a more dense distribution of channels 302 than other regions (e.g. tip). The fluid channels 302 can have a constant cross section (e.g. uniform diameter) along the entire channel length. Also, select portions of the channels can be formed with larger diameters (e.g. to enhance heat transfer at particular components/geometries, e.g. spar caps). As shown in the exemplary embodiment of FIG. 2, a first fluid channels 302a can have a greater surface area in contact with the B-surface of the composite part than a second fluid channel 302b. For example, fluid channel 302a can be located on top of the spar cap, which is a wider and thicker structure than the surrounding skin so requires additional cooling capacity relative to the neighboring skin; whereas fluid channel 302b is located on top of the auxiliary spar cap (which is narrower and thinner than the main spar cap under 302a and thus covers a smaller surface area than channel 302a). In some embodiments certain sections are left exposed to cooling via ambient air (i.e. not actively cooled by the fluid channels) with the vacuum bag extending over the surface of the blade skin.

Additionally or alternatively, select fluid channels can serve as main supply channels (e.g. inlet, outlet) which have a greater volume (e.g. diameter) than distribution channels, which are fluidly coupled to the main channels (e.g. branch outwardly), and serve to direct heating/cooling fluid across particular regions of the blade. In other words, the fluid channel network can include larger inlet/outlet channels that branch off to smaller distribution channels for localized delivery of the thermal fluid to predetermined positions (e.g. root, spar cap, etc.). In some embodiments the channels can be configured for unidirectional flow, with a first portion/series of channels serving as input and distribution channels across the blade surface, and a second portion/series of channels serving as retrieval/return and output channels for collection and removal from the vacuum bag (or repeat/recycling if so desired). For example cooling fluid can be supplied at the root region and directed along the blade span until reaching the tip section, and thereafter returning to the heat exchanger. Additionally or alternatively, the fluid circuit can be configured with smaller/multiple recirculating zones. For instance, a first "local" circuit can be established with cooling fluid supplied at the root and directed along a sub-portion of the blade, e.g. up to the spar cap, and return to the heat exchanger. A second "global" circuit can be established with cooling fluid supplied at the root and directed along the entire blade span (i.e. to the tip) and thereafter return to the heat exchanger.

Figure 3:
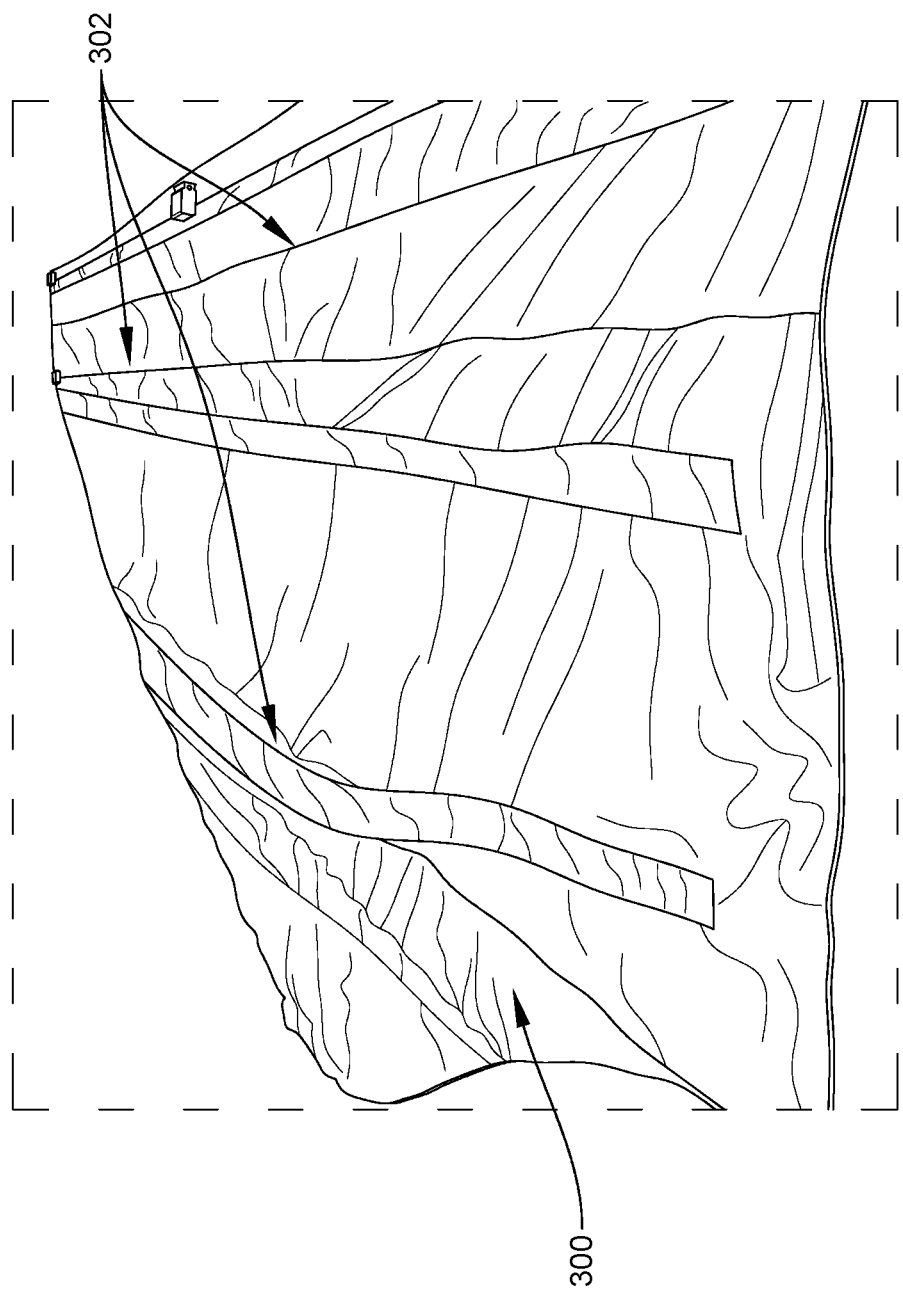
FIG. 3 illustrates an exemplary heating/cooling device according to embodiments of the present disclosure.

The fluid channels 302 are passages which can be created by securing plastic strips to the outer surface of the vacuum bags (e.g. using double sided tapes) to prevent leakage. FIG. 3 depicts an exemplary embodiment of a vacuum bag 300 having fluid channels 302 formed therein. The shape of the channels as well as the use of hot or cold fluid depends on the heat/cool zones and the application. For example, to accelerate the cooling down of main girder's B-surface to allow for immediate application of adhesive bead, a cold fluid channel is positioned over the main girder from root to tip. Similarly, for areas in the root where reaching the desired degree of cure takes longer, a suitable fluid pocket design can be implemented to circulate the hot fluid—thereby expediting the cure process.

Figure 4:
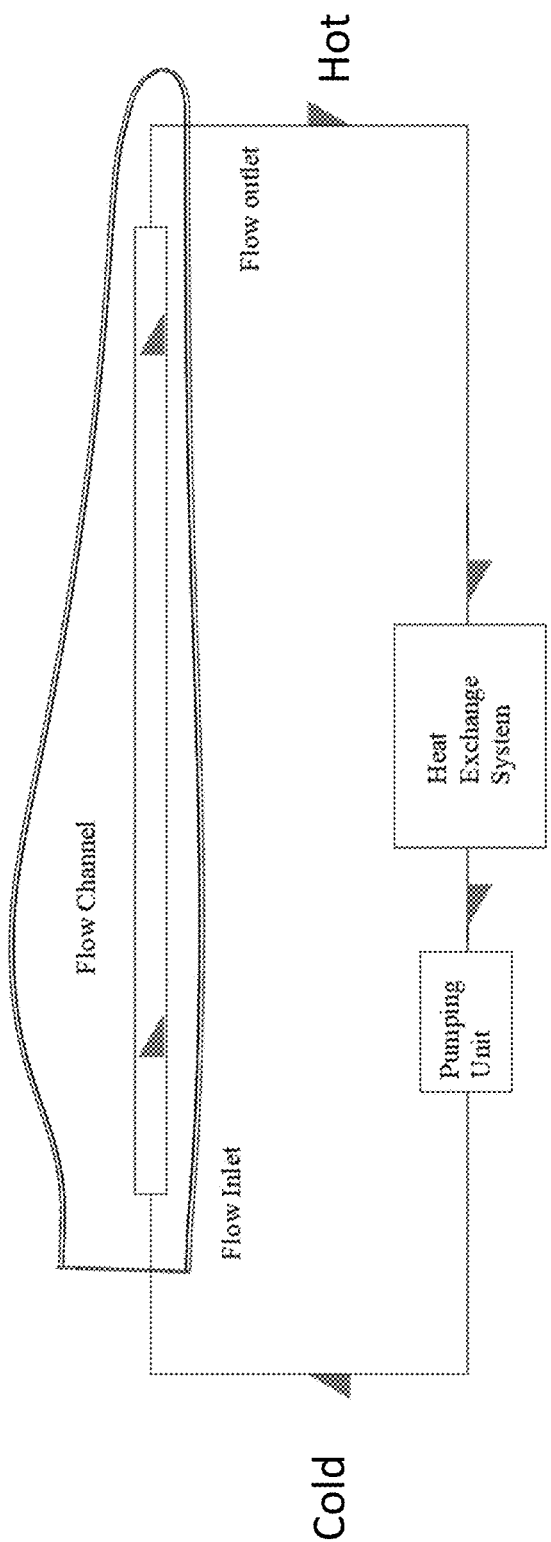
FIGS. 4-5 illustrate a thermal cycle according to embodiments of the present disclosure.

In accordance with another aspect of the disclosure, a fluid circulation system is provided for delivering, circulating and retrieving the heating/cooling fluid through the fluid channels 302 on the outer surface of the vacuum bag. A schematic of an exemplary (cooling) fluid circulation system is provided in FIG. 4. Once the fluid reaches the end of the fluid channel pocket, it enters the heat exchange system through the fluid channel outlet. The heat exchange system could be a heating or a refrigeration unit depending on the desired thermal application. Once the temperature of the fluid is brought back to the designed value, it can be re-circulated through the flow channel. The heating and cooling capacity of the system is controlled by temperature of the entering fluid as well as the flow rate.

Figure 5:
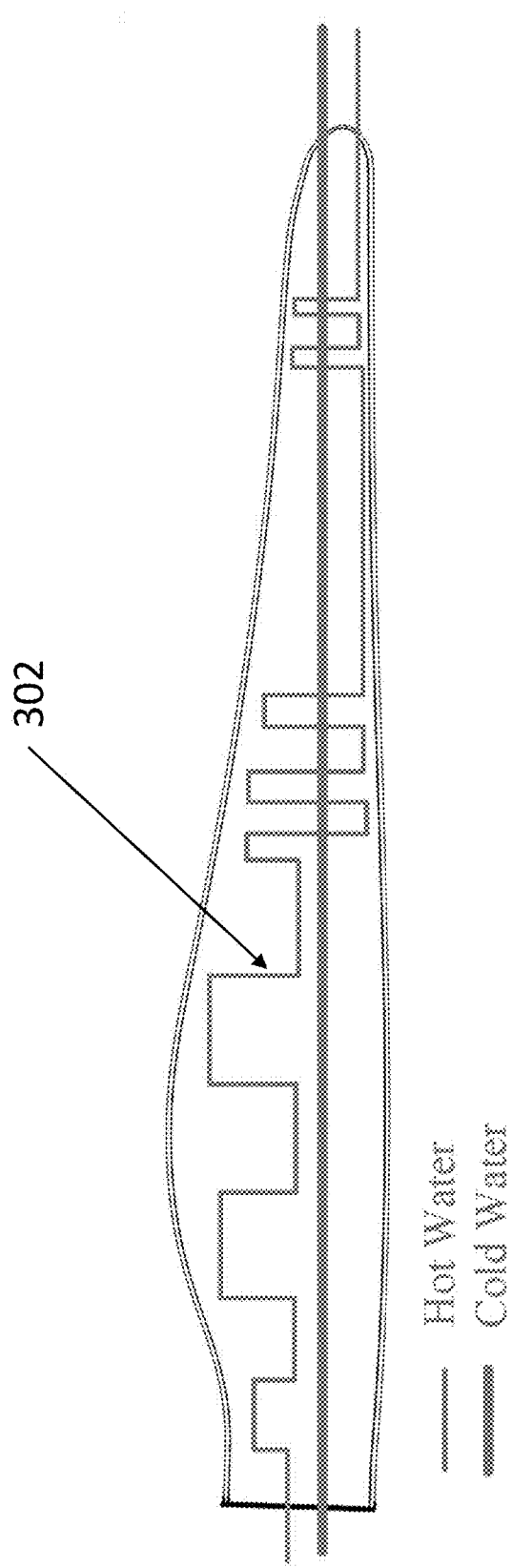

In the exemplary embodiment shown in FIG. 5, the fluid channels can have a pattern reflecting the underlying components (e.g. spar caps) which direct the cooling fluid along varying chord-wise distances to provide sufficient dwell time to achieve the desired heat transfer. In the illustrated embodiment, the staggered channel pattern represent the heated flow path and the straight channel pattern represents the cooling flow path (though it will be understood that the flow paths need not be linear). As shown, the excess length of the hot water circuit results in additional exposure of the heating fluid to the blade surface to enhance heat transfer therebetween (though it will be understood that this staggered circuit can supply cooling fluid if desired). Furthermore, although a single fluid channel is shown, any number of channels can be provided—with each channel having its own fluid supply inlet and outlet to permit fluid flow across the mold surfaces.

Accordingly, the B-surface heating and cooling system disclosed herein not only accelerates the production process but also improves the quality of the demolded blades by better distributing the heat across the thickness of the part and ensuring the proper degree of cure throughout the blade. Additionally the present disclosure reduces the cure process time; avoids/minimizes non-uniform degree of cure in the blade; provides controlled B-surface temperature; and monitors/avoids glass transition temperature (Tg) criteria violation. Furthermore, the present disclosure reduces overall cycle time by reducing delay in mold closure step (i.e. where the first mold half is inverted on top of the second mold half to form a complete, closed, blade) by reducing the hot surfaces (e.g. spar cap).

The present disclosure is applicable to a variety of blade designs, including ones with shear web(s) and corresponding spar caps. The upper and lower mold skins can also include a core material, e.g. having an increasing thickness from the midpoint to trailing edge of the blade.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus for forming a composite wind turbine blade comprising:
    a first turbine blade half comprising a first shell;
    a second turbine blade half comprising a second shell;
    a first mold half in an open configuration, comprising a first mold surface corresponding to the first shell;
    a second mold half in an open configuration, comprising a second mold surface corresponding to the second shell;
    a first vacuum bag overlaid on a spar cap on a B-surface of the first shell; and
    a second vacuum bag overlaid on a spar cap on a B-surface of the second shell, the first vacuum bag distinct from the second vacuum bag;
    wherein the first vacuum bag includes a first series of fluid channels for heating fluid and a second series of fluid channels for cooling fluid, each of the first and second series of fluid channels disposed on an outer surface of the first vacuum bag, at least a portion of each of the first and second series of fluid channels disposed proximate the first shell; and
    wherein the second vacuum bag includes a third series of fluid channels for heating fluid and a fourth series of channels for cooling fluid, each of the third and fourth series of fluid channels disposed on an outer surface of the second vacuum bag, at least a portion of each of the third and fourth series of fluid channels disposed proximate the second shell;

wherein each of the first and second vacuum bags comprises a root region and a tip region, the root region having a first density of fluid channels and the tip region having a second density of fluid channels; and wherein the first density of fluid channels is greater than the second density of fluid channels;

wherein the first density of fluid channels has a greater surface area in contact with the B-surfaces of the wind turbine blade than the density of second fluid channels;

an inlet fluid channel;

an outlet fluid channel, wherein each of the inlet fluid channel and the outlet fluid channel are configured with a greater cross section than fluidly coupled first, second, third and fourth series of fluid channels.

2. The apparatus of claim 1, wherein the first mold half includes a heating element disposed proximate the first mold surface.

3. The apparatus of claim 1, wherein the second mold half includes a heating element disposed proximate the second mold surface.

4. The apparatus of claim 1, wherein at least one of the fluid channel extends along the entire span of the blade.

5. The apparatus of claim 1, wherein at least one of the fluid channel extends from a leading edge to a trailing edge of the blade.

6. The apparatus of claim 1, wherein the fluid channels are configured for unidirectional flow.

7. The apparatus of claim 1, wherein a first fluid channel of the first or second series of fluid channels has a greater surface area in contact with the surface of the first shell than a second fluid channel of the first or second series of fluid channels.

8. The apparatus of claim 1, wherein the cooling fluid travels from the root region towards the tip region of at least one of the first and second vacuum bags and into a heat exchanger.

9. The apparatus of claim 1, wherein at least one of the first series or the second series of fluid channels is disposed on top of the first shell in a pattern reflecting the spar cap and at least one of the third series or the fourth series of fluid channels is disposed on top of the second shell in a pattern reflecting the spar cap.

* * * * *